April 19, 1949.  J. M. SALTER  2,467,500
JACK
Filed Sept. 19, 1945
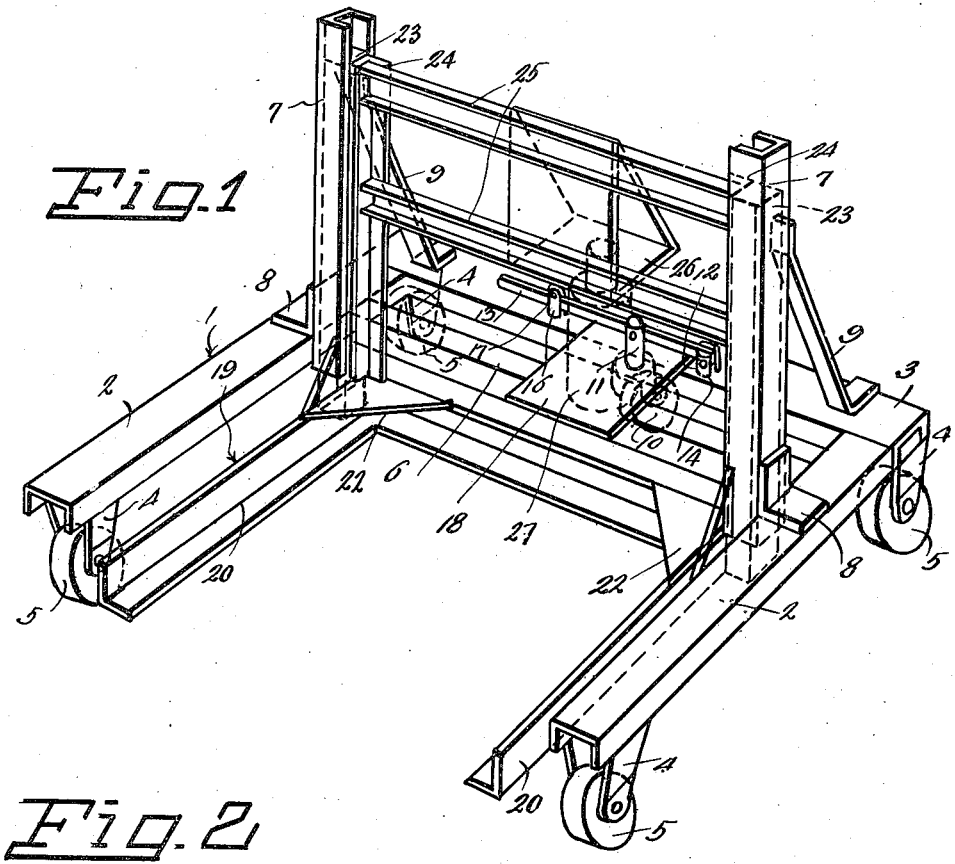
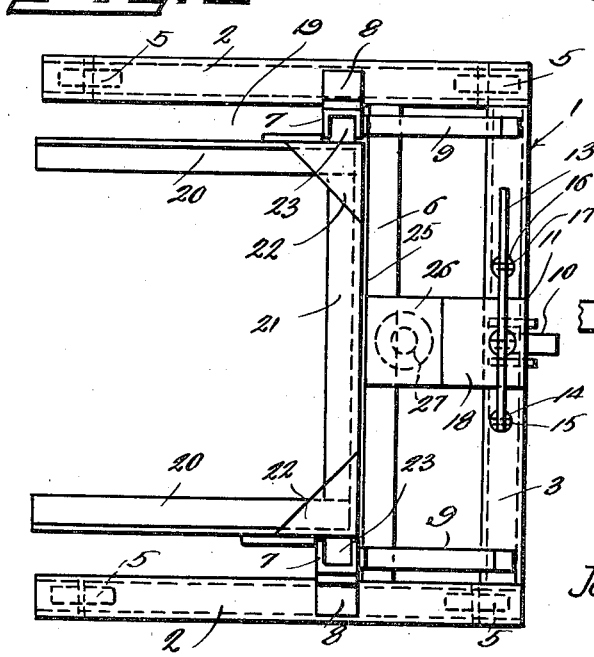
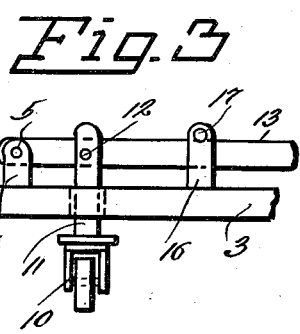
INVENTOR
James M. Salter
BY
Glenn L. Fish
ATTORNEY Patented Apr. 19, 1949

2,467,500

UNITED STATES PATENT OFFICE 2,467,500

JACK

James M. Salter, Geiger Field, Wash.

Application September 19, 1945, Serial No. 617,302

2 Claims. (Cl. 254—2)

This invention relates to a jack and more particularly to a jack by means of which a heavy wheel and tire thereon may be very easily removed from the axle of a truck, bus, airplane, or other large vehicle and another set in place upon the axle.

Another object of the invention is to provide a jack including a wheeled frame and a wheel-engaging member or cradle so mounted that it may be shifted vertically after being disposed under the wheel and the wheel thus lifted to such an extent that it may be easily moved off of the axle and then transported to a place where repairs may be made to the wheel or a tire on the wheel removed and another applied to the wheel.

Another object of the invention is to provide a jack so formed that when a wheel is removed from an axle it will be supported in a substantially upright position while resting upon the cradle of the device.

Another object of the invention is to provide a wheel remover which is very strong, easy to operate, and of such formation that it will occupy a minimum amount of space when not in use.

The invention is illustrated in the accompanying drawings wherein:

Fig. 1 is a perspective view of the improved wheel removing device.

Fig. 2 is a top plan view thereof.

Fig. 3 is a fragmentary view of a castor and mounting means for the same.

This improved wheel removing device or jack has a frame 1 formed of strong metal and having side bars 2 connected by a rear end bar 3. Brackets 4 extend downwardly from the frame at front and rear corners thereof and carry wheels 5 upon which the device rolls when being moved from one place to another. A cross bar 6 extends between the side bars 2 forwardly of the rear end bar and serves to brace the side bars and prevent them from moving transversely out of parallel relation to each other when subjected to strains. Standards 7 formed of channel metal and open along their inner sides extend upwardly from the side bars forwardly of the cross bar 6 and have their lower ends welded to the side bars. Brackets 8 reinforce the standards at their connection with the side bars and there have also been provided braces 9 which prevent the standards from being tilted rearwardly when subjected to strain of a tire and wheel which is being transported from or to a land vehicle or air craft. The brackets 4 are rigid with the frame and when all of the wheels 5 are resting upon the ground or a floor the device may only be freely moved forwardly and rearwardly. At times it is desired to turn the device or shift it transversely and in order to permit this to be easily done there has been provided a castor 10 journaled in a post 11 which extends upwardly through an opening in the end bar 3 and formed with forks through which a pin 12 is passed to connect the post with a lever 13. This lever is pivoted to a bearing bracket 14 by a pin 15 and in order that the post may be held depressed with the castor engaging the ground and the rear wheels out of contact with the ground there has been provided a forked cleat into which the lever may be depressed and secured by a removable pin 17. A platform 18 extends longitudinally of the frame midway the width thereof and is secured upon the rear bar 3 and the cross bar 6.

A cradle 19 for receiving a wheel and tire thereon is carried by the frame 1 and has side bars 20 formed of angle metal and connected by a rear cross bar 21 which is also formed of angle metal, bracing plates 22 being provided to brace the connected ends of the bars 20 and 21 and prevent spreading of the side bar when subjected to weight of a wheel and a tire. Posts 23 are mounted vertically at front corners of the cradle and are slidably received in the standards 7 for vertical movement. These posts carry strips of angle metal 24 which form flanges projecting from the posts inwardly of the frame and the cradle and to these strips 24 are secured ends of cross bars or rails 25 formed of channel metal. Any number of cross bars 25 desired may be provided, but two have been shown and to these cross bars there has been secured a triangular shaped bracket 26 which projects from them rearwardly of the frame in overhanding relation to the plate 18. A hydraulic jack 27 rests upon the plate 18 under the bracket 26 and when the plunger of the jack is shifted upwardly the cradle will be raised and supported in the raised position.

When a wheel is to be removed from a large truck, bus or airplane a jack of conventional formation is disposed under the axle and the axle raised sufficiently to dispose the wheels out of engagement with the ground. The improved jack or wheel removing device is then moved into position disposing it at a side of a wheel transversely thereof and the forward portion of the frame 1 thrust inwardly under the wheel with one side bar 2 in front of the wheel and the other back of the wheel. The jack 27 is then actuated to raise the cradle and as the side bars 20 thereof engage under front and rear portions of the tire the tire and the wheel will be raised sufficiently to take the weight of the same off of the spindle about which the wheel is rotatably mounted. The wheel is freed from the spindle and when the frame is pulled rearwardly the wheel will move outwardly with it until it is entirely freed from the spindle and is tilted to a position in which it rests against the cross bars 25 and is supported entirely upon the cradle. The device may then be moved along the ground to a shop where the necessary repairs or replacements will be made and when such repairs are made or a new tire applied the wheel will be transported back to the bus or plane and applied to the spindle. Of course a spare wheel and tire may be applied to the spindle in place of the one removed if so desired.

Having thus described the invention, what is claimed is:

1. A wheel removing device comprising a frame having side bars and a rear end bar, wheels for said frame, a cross bar mounted between the side bars forwardly of the rear end bar, a platform midway the width of said frame mounted upon the cross bar and the rear end bar, standards rising from the side bars forwardly of the cross bar, the standards being open along their inner sides, a cradle having side bars and a rear cross bar formed of angle metal, posts extending upwardly from rear corners of said cradle and being slidably received in said standards and mounting the cradle for vertical movement between the side bars of the frame to raised and lowered positions, strips of angle metal carried by said posts and providing flanges along the posts extending inwardly of the frame, rails extending between said posts and being secured to said strips and braced against rearward displacement by the flanges of the strips, a triangular abutment bracket carried by said rails and projecting rearwardly therefrom over said platform, and a jack mounted upon said platform under said bracket for engaging under the bracket and exerting upward push to raise the cradle and hold the cradle in the raised position.

2. A wheel removing device comprising a frame provided with supporting wheels and of a height adapting it to be thrust under a side of a vehicle, said frame being open at its front end and having side bars for fitting under front and rear portions of a wheel and a tire thereon when the frame is thrust under the vehicle, standards rising from the side bars adjacent the rear end of the frame and open along their inner sides, a cradle shiftable vertically between the side bars of said frame and having side bars of angle metal having inwardly extending flanges along their lower edges for engaging front and rear portions of the tire of the wheel and lifting the wheel when the cradle is raised, a wall across the rear end of said cradle and having posts mounted vertically at opposite sides of the cradle and slidably received in said standards, said wall constituting means for supporting a wheel and tire upright upon the cradle, an abutment projecting rearwardly from said wall over the rear portion of said frame, and a jack mounted upon the rear portion of said frame and disposed under said bracket for engaging the under face of the abutment and exerting upward thrust to move the cradle upwardly and support the cradle in a raised position.

JAMES M. SALTER.

REFERENCES CITED

The following references are of record in the file of this patent:

UNITED STATES PATENTS

| Number | Name | Date |
|---|---|---|
| 833,253 | Shafer | Oct. 16, 1906 |
| 1,523,486 | Manley | Jan. 20, 1925 |
| 2,364,918 | Roberson | Dec. 12, 1944 |